Dec. 13, 1955  H. J. ASBECK ET AL  2,726,632
APPLICATOR FOR HIGHLY VISCOUS LIQUIDS
Filed March 31, 1952  2 Sheets-Sheet 1
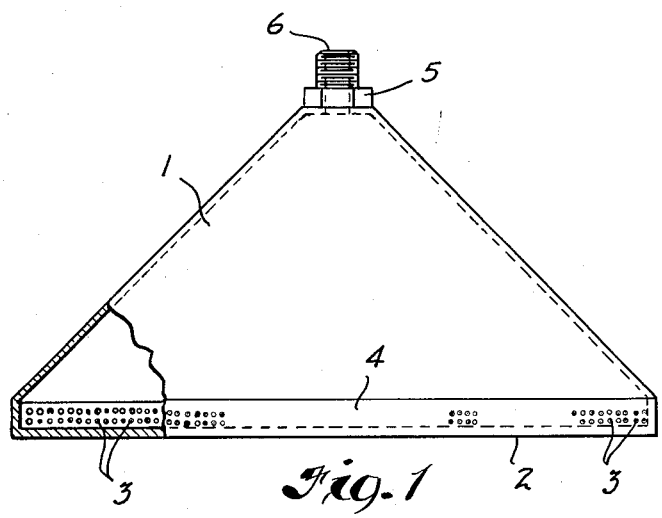
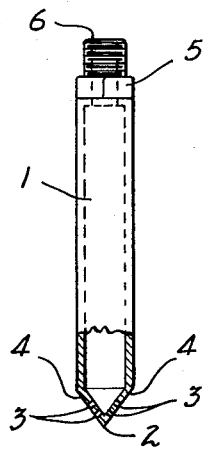
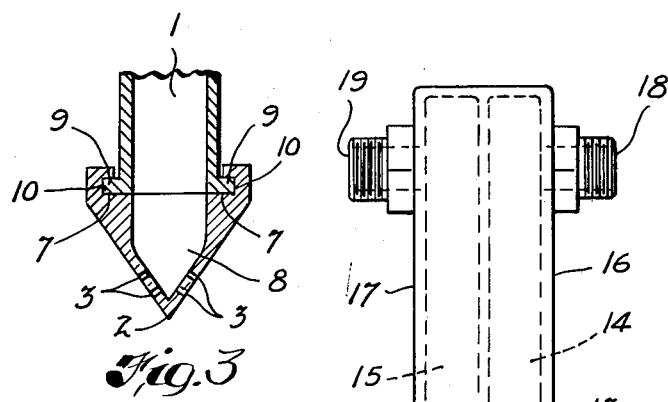
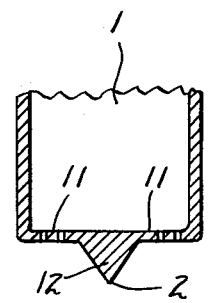
INVENTORS
HANS J. ASBECK and
BY LLOYD J. JORDAN
ATTORNEY INVENTORS
HANS J. ASBECK AND
BY LLOYD J. JORDAN
Robert A. Sturges
ATTORNEY

United States Patent Office 2,726,632
Patented Dec. 13, 1955

2,726,632
APPLICATOR FOR HIGHLY VISCOUS LIQUIDS

Hans J. Asbeck, Lakewood, and Lloyd J. Jordan, Eastlake, Ohio, assignors to The Sherwin-Williams Company, Cleveland, Ohio, a corporation of Ohio Application March 31, 1952, Serial No. 279,584

10 Claims. (Cl. 118—410)

This invention relates to a novel and useful applicator for applying high solid liquids, and particularly to the application of such liquids to porous surfaces to form a smooth coating thereon. The herein described device is particularly adapted to apply coatings to porous building materials including lumber, concrete blocks, cinder blocks, bricks, tiles, plastered surfaces, plaster board, poured concrete, and the like. The liquids which are conveniently applied by means of this device are ordinarily very viscous compositions having, as a general rule, a consistency similar to that of molasses at ordinary temperatures. Fluidity comparable to a number 10 SAE mineral oil or materials of lower viscosity should be avoided in coating porous materials of the aforementioned types if penetration into the pores and voids is to be avoided. Even with the more viscous materials which are used in the applicator of this invention there is penetration into such pores and voids to some extent although it is desired to maintain this to a minimum. Some penetration into the pores is distinctly advantageous, of course, in providing a means for anchoring the film to the porous surface.

Ordinary methods of applying coating compositions such as brushing, roller coating, spraying, dipping, etc. cannot be used with such high viscosity materials and it is, therefore, a principal object of this invention to provide an improved applicator for high viscosity and high solids liquid coating compositions.

A principal objective in coating concrete block or other such building material is to provide a smooth regular surface free from suction spots or depressed areas. It has been found that this may be accomplished by employing at least two coating operations virtually simultaeously. In certain instances, if there is an appreciable time lag between successive coatings, particularly where such coatings are set by the addition of a catalyst, the result is not as satisfactory because of different degrees of setting of the successive layers.

It is another principal object of this invention, therefore, to provide a single unit applicator which in a single pass over the porous surface will provide a first or filler coat and immediately thereafter a finish coating. In most instances, it has been found desirable to provide a film thickness ranging from 5 to 70 mils exclusive of amounts film-forming material utilized to fill pores and voids.

By altering the structure of the applicator as by introducing a baffle plate to divide the applicator into two or more sections, it is possible to lay down successive coatings, which coatings have different compositions. However, in normal use, two layers of the same composition are usually deposited.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

In the annexed drawings:

Fig. 1 is a front elevation of one embodiment of this invention.

Fig. 2 is an end view of the applicator shown in Fig. 1.

Fig. 3 is a fragmentary illustration of an embodiment of this invention showing a construction permitting removal of the applicator head for ease of cleaning.

Fig. 4 is a fragmentary end view showing another modification of the applicator head.

Fig. 5 illustrates a modification of an applicator in accordance with this invention whereby two coatings of different composition may be applied.

Figure 6:
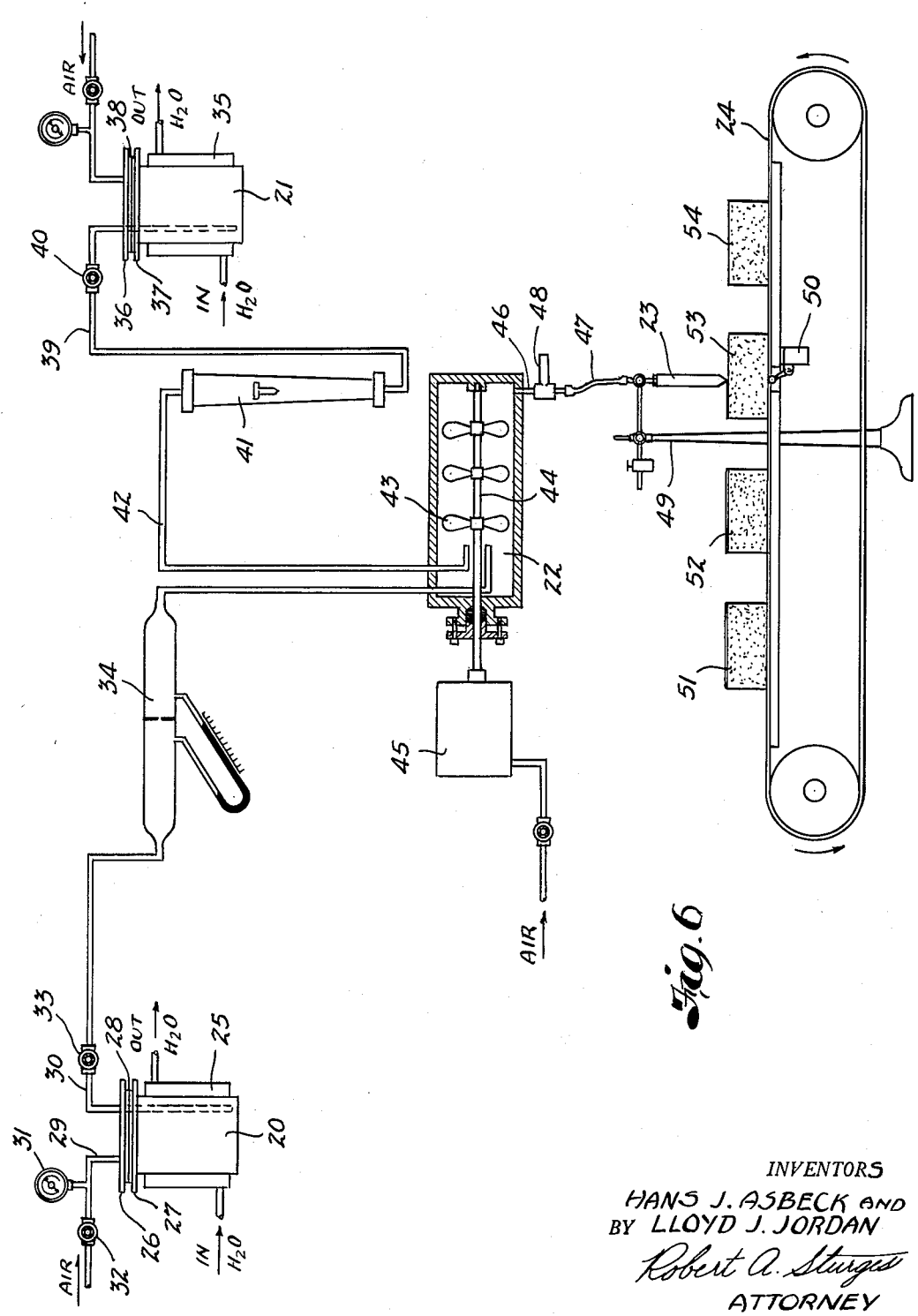
Fig. 6 illustrates in diagrammatic form an apparatus which may be used in conjunction with the applicator of this invention for coating concrete block.

Broadly stated, therefore, this invention comprises the provision of an applicator for application of high viscosity high solids liquids under pressure, comprising a hollow header member, the lower portion of which is provided with a plurality of rows of spaced ports in substantial alignment with the major axis of a doctor blade located between two of said rows of spaced ports, the operating edge of said doctor blade extending below said rows of spaced ports.

Referring more particularly to the drawings, it will be observed that in Fig. 1 there has been provided a substantially triangularly shaped liquid-containing or header member 1 terminating in a doctor blade edge 2. A series of small ports 3 has been provided at the lower extremity of the liquid-containing member 1 and in substantial alignment with the doctor blade edge 2. For ordinary purposes these ports may be from about 3/32 of an inch to 1/128 of an inch in diameter. Although it is preferable to align the ports 3 in a straight line uniformly spaced from the doctor blade 2, minor variations from straight line may be tolerated. The lateral spacing of said ports 3 may also be uniform, ranging from about 3/32 of an inch to as much as 1/4 of an inch apart. It has been found that with the particular structure as illustrated in Fig. 1, there is a greater flow of material through the ports 3 at the outer extremities of the device than through the more centrally located parts and accordingly it is desirable to adjust the diameter and/or the spacing of the ports 3 at such outer extremities to account for the variation in flow rate. However, where the shape of the liquid-retaining vessel is different, the flow characteristic may also be altered, making such minor modifications unnecessary.

As is shown in Fig. 1, there is a corresponding row or rows of ports 3 immediately in back of the doctor blade on the reverse side of the device. One or more rows of ports 3 in front of and in back of the doctor blade 2 may be used and, depending upon the desired thickness of the ultimate film, there may be one row of ports forward of the doctor blade to provide the pore filling or void filling quantities of film-forming liquid and one or more rows of ports 3 in back of the doctor blade 2 to provide the finish coat.

Fig. 2 is an end view of the applicator shown in Fig. 1 and shows the provision of ports in converging sides 4 of the liquid container 1 both in front of and in back of the doctor blade 2.

The top portion 5 of the applicator as shown in Figs. 1 and 2 comprises a closure portion adapted to admit liquid or a fluid composition under pressure.

A suitable fitting means 6 is also provided whereby suitable hose connection, not shown, may be made to supply the applicator with fluid under pressure. It is obvious that a plurality of closure means and fitting means may be provided where it is desired to introduce a plurality of fluids under pressure.

Fig. 3 illustrates a bottom portion of an applicator in accordance with this invention, which bottom portion is removably attached to the bottom of the liquid retaining or liquid distributing head of an applicator. Any suitable means of removably attaching a doctor blade portion or a doctor blade-liquid dispensing member to the bottom of the liquid container may be employed. The embodiment shown in Fig. 3 illustrates a combined doctor blade 2 and liquid ejecting ports 3 both in front of and behind the doctor blade which is removable to permit easier cleaning. Of course it is necessary that the joint 7 between the top portion 1 and the doctor blade portion 8 be sufficiently tight to retain the liquid and prevent its leaking through the joints 7. In this illustration there is provided a doctor blade portion 2 the side extensions of which are fitted with a plurality of ports 3, which ports 3 are in substantial parallel alignment with the major axis of the doctor blade or the doctor blade operating edge 2. Suitable flanges 9 are provided on the header 1 adapted to be slideably mounted in the retaining grooves 10 of the lower portion 8, the relatively contacting surfaces at the interfaces or joints 7 being held in substantial contact by pressure of the retaining grooves 10. It is obvious that other means of attaching the head in removable manner may be employed without departing from the spirit of this invention.

While it is convenient to provide the liquid dispensing ports in converging side portions which are in effect continuations of the sides of the liquid retaining member, other modifications adapted to dispense the liquid ahead of and behind the doctor blade may be employed. Fig. 4 illustrates such a modification. In this case the bottom portion of the liquid retaining or liquid distributing head 1 is squared off at the bottom rather than tapered into a doctor blade so that the liquid dispensing ports 3 are disposed in horizontal members 11 forward and rearward of the doctor blade edge 2. The doctor blade 12 may be a solid metal bar suitably attached to the bottom of the liquid retaining or liquid distributing head 1 such as, by welding or sliding a doctor blade through ways provided to receive a slideable doctor blade member. Here again the ports are in substantial axial alignment with the major axis of the doctor blade edge 2 and have substantially the same size and spacing as indicated above under the discussion of Fig. 1.

Fig. 5 shows another modification of the applicator of this invention wherein there is provided a baffle plate or separator plate 13 dividing the liquid retaining chamber into two sections 14 and 15 through the middle of the device and parallel to its major surfaces 16 and 17. In this modification two liquid introducing conduits 18 and 19 are provided so that two different liquids may be dispensed through the same head if such is desired. Assuming that the porous material is moving past the applicator from right to left of Fig. 5, the liquid flowing into the forward liquid receiving chamber 14, is laid down first when the device is in operation, this material doctored into the pores of the porous material being coated by the doctor blade 2, and an after coat or top layer laid down by forcing the liquid in chamber 15 through the ports 3 to the rear of the doctor blade 2.

Fig. 6 illustrates an apparatus showing a means for coating concrete block or cinder block utilizing the applicator of this invention. This apparatus comprises a coating composition storage tank 20, a catalyst storage tank 21, a mixing device 22, an applicator head 23 and concrete blocks carried on a conveyer 24. In the coating composition tank 20 there has been provided a jacket 25 through which water at the desired temperature may be circulated to control the temperature of the contents. Since this system operates under positive pressure, the storage tank 20 may be fitted with flanges 26 and 27 separated by a suitable gasket 28 and inlet and outlet ports 29 and 30, respectively. The inlet port 29 is a valved conduit for air or other suitable fluid under pressure fitted with a pressure indicating device 31 and a valve 32. The conduit 30 is also valved, 33, and serves as a means for carrying the contents of the storage tank 20 to the agitator or mixer 22. The conduit 30 is provided with a flow meter 34 of suitable construction, the flow through the conduit 30 being regulated by the valve 33.

The catalyst storage tank or receiver 21 is also jacketed, 35, so that the temperature of the contents may be regulated as by introducing water at a pre-selected temperature through the jacket 35. This receiver is also a part of a closed pressure system and is therefore adapted to such structure by, for example, providing flanges 36 and 37 at the top of the receiver and a suitable gasket 38 for pressure retaining purposes.

The condiut 39 leading from the catalyst receiver tank 21 flows through a regulating valve 40 and a rate of flow measuring device such as a rotameter 41. The efflux from the rotameter is conducted through a conduit 42 to the agitator or mixer 22 where it is intimately blended under pressure with the metered coating composition from the storage tank 20. A diagrammatic sketch of the agitator mixer 22 is shown. It will be noted that the respective liquids are introduced into the mixer 22 through conduits 30 and 42 located in the highly turbulent area immediately behind the propeller 43. The propeller shaft 44 is rotated at high speed by an air motor or other suitable rotating device 45.

The mixed liquid coating composition flows from the agitator mixer 22 through a conduit 46, through a valve 48 and into a flexible conduit 47. The valve 48 is a quick closing solenoid valve or other such rapid control device and controls the flow of fluid into the applicator head 23 of this invention. Suitable means 49 diagrammatically shown in Fig. 6 for positioning the head in contact with the surface of the block and rigidly fixing the position of the head are provided. Such means must be able to account for variations in thickness of the concrete block up to ¼ of an inch and then retain the applicator head in close contact with the surface as it passes beneath the head. The quick closing valve 48 is actuated by the block contacting the switch 50 so that the flow of fluid through the applicator 23 may be controlled to shut off when the head has just completed its pass over the block, and then open as soon as the next block is beneath the applicator. This avoids waste of coating composition and also contamination of the conveyer system with hardened coating composition. A trip switch 50 is shown for this purpose and it operates the valve 48. Concrete blocks 51, 52, 53 and 54 are shown on the conveyer 24. Blocks 51 and 52 have been coated, block 53 is in the process of being coated and block 54 is uncoated.

This is merely an illustration of an apparatus of the type which has been used by us to coat concrete block with a pigmented or clear polyepoxy ether resin such as disclosed in the patent to Bradley 2,541,027, dated February 13, 1951, catalyzed by ethylenediamine in the amount of from about .5 to about 10% by weight of the resin. The resin normally employed has a viscosity of from about R to $Z_5$ on the Gardner-Holdt scale. Normally it is preferred not to use any solvents with the material but in some cases it is desirable to include from 1% to 10% by weight of the resin of an organic solvent to improve the flow and setting characteristics of the ether resin which is employed.

There are two ways of controlling the cut off of the fluid flow through the head. This may be accomplished either by directly shutting off the supply of fluid to the head or by cutting off the gas pressure on the system. In order to effect such cut off cleanly, it is desirable to maintain the size of the ports to within the limits mentioned above since under either cut off procedure, i. e., direct cut off of fluid or release of pressure on the system, the normal atmospheric air pressure is sufficient to retain the fluid within the head without permitting dripping over the edge of the block as it clears the applicator head.

The width of the applicator is desirably equivalent to at least the width, or one dimension of the article which is being coated. In the case of concrete blocks, a satisfactory width is about 7⅝ inches. In many cases it will be found desirable to permit the width to extend somewhat beyond the edges of the material being coated in order to assure that ragged edges commonly occurring in concrete blocks, limestone blocks, cinder blocks, and the like will be coated so as not to present radically contrasting areas in these portions of the block. Still more desirably, it may be found advantageous to attach vertically depending wiper blades which will serve to trap and direct over-flow material into the ragged edges. These may be in the form of rubber attachments adapted to fit either end of the device.

Since the concrete block or other such aggregate material has a very strong abrasive effect, it is desirable to construct the applicator out of sheet steel. In certain instances it may be found desirable to construct the doctor blade edge of a high grade tool steel or other such alloy which is capable of withstanding for longer periods of time the abrasive effect of the material being coated. The ingredients of the coating composition are not generally corrosive and for this reason no particular precautions to protect against corrosion are necessary and the balance of the apparatus as shown in Fig. 6 may be made of ordinary materials. A rubber hose may be used for the conduit 47 as shown in Fig. 6 providing it is able to stand pressures of from 30 to 125 lbs. per square inch, the latter being the normal pressure range under which the system is operated. Satisfactory results have been obtained with pressures of 50 lbs. per square inch.

The thickness of the film deposited on the porous surface may be varied by two means, namely, varying the pressure under which the system is operated or by varying the number of rows of ports 3 in front of and behind the doctor blade. In normal operation the applicator is in close contact with the surface of the material being coated, sufficient pressure being applied mechanically to assure such contact whereby a wiping action is secured.

It will be obvious to those skilled in the art that the applicators of this invention may be used in multiple units so that more than one block can be coated at the same time. In the concrete block manufacturing art, it is usual that three blocks are carried upon a single palette. Conveyer means adapted to receive a palette and carry it and the blocks beneath a multiple unit carrying three applicator heads may therefore be devised. Since the coating composition normally employed for this purpose is characterized by remarkable adherence to almost any material, it is desirable to provide means for preventing the build-up from over-flow and drippings of this material in the conveyor, the palette or the moving parts of the conveyer system. This may be done by coating the exposed parts with a masking compound which contains non-drying components of the type which is normally used in coating the interior of spray booths. This permits ready removal of drippings because it serves to interpose a non-drying film between the coating composition and the parts which must be kept free of "build up."

It is essential in the applicators of this invention that a plurality of rows of ports disposed in front of and in back of the doctor blade edge be provided, since it is only through a dual coating system of the type described that smooth finishes can be applied to what is normally a very rough surface. The finishes which may be produced utilizing the head of this invention are comparable to glazed tile in appearance and the resin preferably employed in connection herewith has properties which make it admirably suited for the present purposes. The dried film is flexible, remarkably adherent to porous inerts normally used in building structures, extremely hard and abrasion resistant, inert to soap and acid solutions and capable of being attractively pigmented, shaded, and tinted. From an economic point of view it is now possible to produce a new interior wall finish or floor finish from building blocks, plaster board, and lumber without the necessity of applying a finish surface. The ornamental effect of glazed tile normally costing in the neighborhood of $2.00 a square foot can now be produced at a cost of approximately 40¢ a square foot.

The rows of ports usually extend from one extremity of the applicator head to the other but closure means at the ends or intermediate thereof may be utilized if desired to prevent flow of the coating composition from a given section or sections of the applicator head.

Better distribution may be secured where both the leading edge and the trailing edge are each provided with two rows of ports alternately spaced, one with respect to the other.

In another modification of the applicator head of this invention, it should be pointed out that the doctor blade may be curved to fit a contoured block, if desired, in which case the ports will be spaced accordingly along the edge of the blade in the same relative position as in the case of a straight edge doctor blade.

Other modes of applying the principle of this invention may be employed instead of those specifically set forth above, changes being made as regards the details herein disclosed, provided the elements set forth in any of the following claims, or the equivalent of such be employed.

We, therefore, particularly point out and distinctly claim as our invention:

1. An applicator for application of high viscosity liquids under pressure, comprising a hollow header member, the lower portion of which is provided with a plurality of rows of spaced ports in substantial alignment with the major axis of a doctor blade located between two of said rows of spaced ports and integral with the bottom portion of said applicator, the operating edge of said doctor blade extending below said rows of spaced ports.

2. An applicator for application of high viscosity, high solids liquids under pressure, comprising a hollow header member having attached to the upper portion thereof pressure-withstanding means for introducing a high viscosity, high solids liquid into the interior thereof and the lower portion of which is provided with a plurality of rows of spaced ports in substantial alignment with the major axis of a doctor blade located between two of said rows of spaced ports and integral with the bottom portion of said applicator, the operating edge of said doctor blade extending below said rows of spaced ports.

3. An applicator for application of high viscosity, high solids liquids under pressure, comprising a hollow header member having attached to the upper portion thereof pressure-withstanding means for introducing a high viscosity, high solids liquid into the interior thereof, and the lower portion of which is provided with a plurality of rows of ports in substantial alignment with the major axis of a doctor blade located between two of said rows of ports, the operating edge of said doctor blade extending below said row of spaced ports and integral with the bottom portion of said applicator, the diameter of said ports being sufficient to permit flow of the liquid being applied therethrough under pressure, but insufficient to permit flow of such liquid at atmospheric pressure.

4. An applicator in accordance with claim 3 wherein the ports have a diameter within the range of about 3/32 inch to about 1/128 inch.

5. An applicator in accordance with claim 3 wherein the ports in a given row are spaced from 3/32 inch to ¼ inch apart.

6. An applicator for application of high viscosity, high solids liquids under pressure, comprising a hollow header member having attached to the upper portion thereof pressure-withstanding means for introducing a high viscosity, high solids liquid into the interior thereof, the sides of said hollow header member converging at the lower end of said header to form a V-shaped straight edge, each of the sides of said V-shaped straight edge being provided with at least one row of ports having a diameter in the range of about 3/32 inch to about 1/128 inch, said ports spaced along a line substantially parallel to the straight edge from about 3/32 to 1/4 inch apart.

7. An applicator in accordance with claim 1 in which the lower portion of the applicator is removably attached to the header portion.

8. An applicator in accordance with claim 1 characterized by the inclusion therein of a separator plate located in the hollow header member and effective to divide the applicator into two isolated compartments whereby two fluids of different composition may be applied.

9. An applicator for application of high viscosity, high solids liquids under pressure, comprising a hollow header member having a plurality of non-communicating chambers and having attached to the upper portion thereof pressure-withstanding means for introducing a high viscosity, high solids liquid into the interior thereof, the sides of said hollow header member converging at the lower end of said header to form a V-shaped straight edge, each of the sides of said V-shaped straight edge being provided with at least one row of ports having a diameter in the range of about 3/32 inch to about 1/128 inch, said ports spaced along a line substantially parallel to the straight edge from about 3/32 to 1/4 inch apart.

10. An applicator for application of high viscosity, high solids liquids under pressure, comprising a multiple non-communicating chamber hollow header member having attached to the upper portion thereof pressure-withstanding means for introducing a high viscosity, high solids liquid into the interior thereof, and the lower portion of which is provided with a plurality of rows of ports in substantial alignment with the major axis of a doctor blade located between two of said rows of ports, the operating edge of said doctor blade extending below said row of spaced ports and made integral with the bottom portion of said applicator, the diameter of said ports being sufficient to permit flow of the liquid being applied therethrough under pressure, but insufficient to permit flow of such liquid at atmospheric pressure.

References Cited in the file of this patent

UNITED STATES PATENTS

| 1,598,811 | Ferrin | Sept. 7, 1926 |
| 1,867,558 | Atwood | July 19, 1932 |
| 2,058,461 | Johnson | Oct. 27, 1936 |
| 2,251,295 | Sheesley | Aug. 5, 1941 |

FOREIGN PATENTS

| 174,059 | Germany | Aug. 27, 1905 |